(12) United States Patent
Simmons et al.

(10) Patent No.: US 6,523,839 B2
(45) Date of Patent: Feb. 25, 2003

(54) SHOVELING HAND CART APPARATUS

(75) Inventors: Gregory Carter Simmons, Shelburne, VT (US); Tyler Rufus Dawson, Williston, VT (US)

(73) Assignee: Vermont Ware, Inc., St. George, VT (US)

( * ) Notice: Subject to any disclaimer, the term of this patent is extended or adjusted under 35 U.S.C. 154(b) by 0 days.

(21) Appl. No.: 09/943,828

(22) Filed: Aug. 31, 2001

(65) Prior Publication Data

US 2002/0047251 A1 Apr. 25, 2002

Related U.S. Application Data

(63) Continuation-in-part of application No. 09/511,299, filed on Feb. 23, 2000, now abandoned.

(51) Int. Cl.[7] .................................................. B62B 3/00
(52) U.S. Cl. ............................... 280/47.34; 280/47.26; 280/79.2
(58) Field of Search .......................... 280/47.371, 47.31, 280/47.315, 47.34, 79.2, 47.26

(56) References Cited

U.S. PATENT DOCUMENTS

| | | | | |
|---|---|---|---|---|
| 237,696 A | * | 2/1881 | Pletsch | 280/47.17 |
| 1,006,985 A | * | 10/1911 | Smith | 298/2 |
| 1,082,323 A | * | 12/1913 | Harris | 280/47.371 |
| 1,436,656 A | | 11/1922 | Monro | |
| 1,561,658 A | * | 11/1925 | Moiser | 280/47.371 |
| 1,649,176 A | * | 11/1927 | Mosier | 280/47.371 |
| 3,418,005 A | | 12/1968 | Allina | |
| 3,857,579 A | * | 12/1974 | Hoodenpyle | 280/47.2 |
| 4,048,735 A | | 9/1977 | Brunt | |
| 4,090,457 A | | 5/1978 | Roberts | |
| 4,130,953 A | | 12/1978 | Bruno | |
| 4,161,073 A | | 7/1979 | Oakes | |

(List continued on next page.)

FOREIGN PATENT DOCUMENTS

DE          3908816 A1  *  9/1990

*Primary Examiner*—Paul N. Dickson
*Assistant Examiner*—Laura Rosenberg
(74) *Attorney, Agent, or Firm*—Thomas N. Neimar; James M. Lees

(57) ABSTRACT

The shoveling hand cart apparatus is a material handling apparatus designed to provide an apparatus that will allow the user easy loading of bulky and heavy items into a wheeled bin by having an open end at or near load/ground height which aids in shoveling/scooping loads in much the way a hand truck operates on boxed loads and allows the user to easily transport contained and loose loads in a bin, and then dump, shovel or slide out the contents of the bin. The shoveling hand cart apparatus is comprised of a handle that has a significant vertical portion prior to the portion that is positioned along the upper part of the sides of the bin in order to permit the operator to work in a comfortable position. The holding area or bin of the cart has a rear arcuate wall and two sides with an open front section. The sides have a vertical dimension that is greater at the area adjacent to the rear arcuate wall and slopes as it goes forward to a smaller vertical dimension. A set of large rear wheels is positioned at the convergence of the sides and the arcuate rear arcuate wall. A set of smaller wheels is positioned at the frontal area of the sides. The design allows the heavy or bulky material to be loaded or unloaded through the open front section of the apparatus.

56 Claims, 6 Drawing Sheets

U.S. PATENT DOCUMENTS

| | | |
|---|---|---|
| 4,214,385 A | 7/1980 | Baranowski |
| 4,302,894 A | 12/1981 | Emma |
| 4,318,655 A | 3/1982 | Svensson |
| 4,350,356 A | 9/1982 | Crothers |
| 4,512,091 A | 4/1985 | Leininger |
| 4,570,961 A | 2/1986 | Chateaureut |
| 4,624,467 A | 11/1986 | Burns |
| 4,629,203 A | 12/1986 | Ballard |
| 4,709,440 A | 12/1987 | Conelly |
| 4,735,424 A | 4/1988 | Stelter |
| 4,767,128 A | 8/1988 | Terhune |
| 4,809,798 A * | 3/1989 | Moist et al. ............... 180/19.1 |
| 4,865,372 A | 9/1989 | Gabriel |
| 4,865,373 A | 9/1989 | Hudson |
| 4,910,893 A | 3/1990 | Asay |
| 4,919,442 A | 4/1990 | Green |
| 4,921,305 A | 5/1990 | Steer |
| 4,958,846 A | 9/1990 | Greenberg |
| 5,017,080 A | 5/1991 | Thorndike |
| 5,048,206 A | 9/1991 | Jones |
| 5,078,415 A * | 1/1992 | Goral ........................ 280/79.2 |
| 5,120,183 A | 6/1992 | Phillips |
| 5,123,187 A | 6/1992 | Zamaria |
| 5,306,028 A * | 4/1994 | Pike et al. ............... 280/47.35 |
| 5,449,224 A | 9/1995 | Johnson |
| 5,493,797 A | 2/1996 | Jackson |
| 5,496,143 A | 3/1996 | Breyer |
| 5,511,327 A | 4/1996 | Jurkowski |
| 5,595,395 A | 1/1997 | Wilson |
| 5,601,298 A | 2/1997 | Watanabe |
| 5,645,290 A * | 7/1997 | Gaffney et al. ........ 280/33.998 |
| 5,692,761 A | 12/1997 | Havlovitz |
| 5,806,868 A | 9/1998 | Collins |
| 5,810,543 A | 9/1998 | Hall |
| 5,842,336 A * | 12/1998 | Chiu ....................... 56/400.02 |
| 5,901,540 A | 5/1999 | Vella |
| 5,971,410 A | 10/1999 | Nichols |
| 5,993,134 A | 11/1999 | Williamson |
| 6,050,576 A | 4/2000 | Tanner |
| 6,223,691 B1 * | 5/2001 | Beattie ....................... 119/453 |

* cited by examiner

SHOVELING HAND CART APPARATUS

This application is a continuation-in-part of U.S. patent application Ser. No. 09/511,299 filed Feb. 23, 2000, now abandoned.

BACKGROUND OF THE INVENTION

This invention pertains to material handling landscaping devices and, in particular, to a shoveling hand cart apparatus for use by individuals to shovel and scoop and move large and bulky items without the necessity of lifting the large and bulky items over the elevated sides found in most garden carts or wheelbarrows.

There are a large number of devices used for carrying heavy loads in landscaping and construction work. Obviously, the most common device is the standard wheelbarrow. Another type of device is the hand truck such as shown in U.S. Pat. No. 4,570,961. The wheelbarrows can carry a heavy load and be pushed into rough areas, but they have their limitations also. The individuals pushing them have to maintain the balance of the wheelbarrow because of the large single wheel at the forward structural area of the wheelbarrow. Also, pushing a wheelbarrow puts an awful lot of pressure on the back of the individual who picks up the handles with a load on the wheelbarrow and then balancing them. Also it takes a lot of work to load them as the material has to be picked up by hand or with a shovel and placed into the wheelbarrow. They are also not.suited for very-large or heavy items like boulders. Attempts have been made to improve the wheelbarrow such as the U.S. Pat. No. 5,601,298 issued on Feb. 11, 1997 to Yoshihisa Watanabe for a Wheelbarrow.

Another type of device is the garden cart which usually has two large wheels just forward of the midpoint of the structure. It is much more stable but still requires a lot of effort to lift items into the cart and lifting the handles with the cart loaded.

What is needed is a shoveling hand cart apparatus that permits the user to load the device without having to lift the item and, at the same time, is designed to be easy to balance and move from one area to another. There is also prior art on shovels and shoveling devices with wheels, such as the U.S. Pat. No. 4,161,073 issued to Jul. 11, 1979 to William Oakes for a "Snow Scoop" and the U.S. Pat. No. 4,214,385 issued to Boleslaw Baranowski et al for a "Apparatus For Taking Up and Removing matter From a Surface". There are some with large almost bin like shovels. However, these devices are primarily wheeled shovels to aid in the shoveling of loose items rather than the lifting and transport of other types of heavy bulky loads. These devices do not have great maneuverability and operability working under heavy loads, nor do they to push and hold the bin at various angles of attack in order to scoop loads at a walking pace.

It is the object of this invention to teach a shoveling hand cart or truck apparatus which avoids the disadvantages and limitations, recited above in previous wheelbarrow and garden cart shoveling apparatus. Another object of this invention is to provide an apparatus that is inexpensive to manufacture, can be massed produced and can be easily used and set up by the user and, at the same time, be effective with heavy loads and also with a variety of large, bulky loads from shoveling snow to moving bulky boulders.

SUMMARY OF THE INVENTION

Particularly, it is the object of this invention to teach a shoveling hand cart apparatus, for use by individuals in order to easily handle bulky or heavy loads with an apparatus that can be quickly loaded and unloaded, comprising a unibody chamber for receiving heavy or bulky loads; said unibody chamber having a base, side walls and an arcuate rear section for enclosing said heavy or bulky loads; said unibody chamber having a rear wheel assembly positioned above the bottom edge of said base of said chamber and adjacent to said side walls and said arcuate rear section; said unibody, chamber further having a front wheel assembly positioned above the bottom edge of said base and adjacent to the forward portion of said side walls; and handle means attached to said side walls for operating and controlling said shoveling hand cart apparatus.

It is also the object of this invention to teach a shoveling hand cart apparatus, for use by individuals in order to easily handle bulky or heavy loads with an apparatus that can be quickly loaded and unloaded, comprising in combination a unibody chamber for receiving heavy or bulky loads having a base, side walls and an arcuate rear section with an open front section, said chamber having a rear wheel assembly and a front wheel assembly and handle means attached to said side walls for operating and controlling said shoveling hand cart apparatus.

BRIEF DESCRIPTION OF THE DRAWINGS

Further objects and features of this invention will become more apparent by reference to the following description taken in conjunction with the following figures, in which.

DETAILED DESCRIPTION OF THE PREFERRED EMBODIMENT

Figure 1:
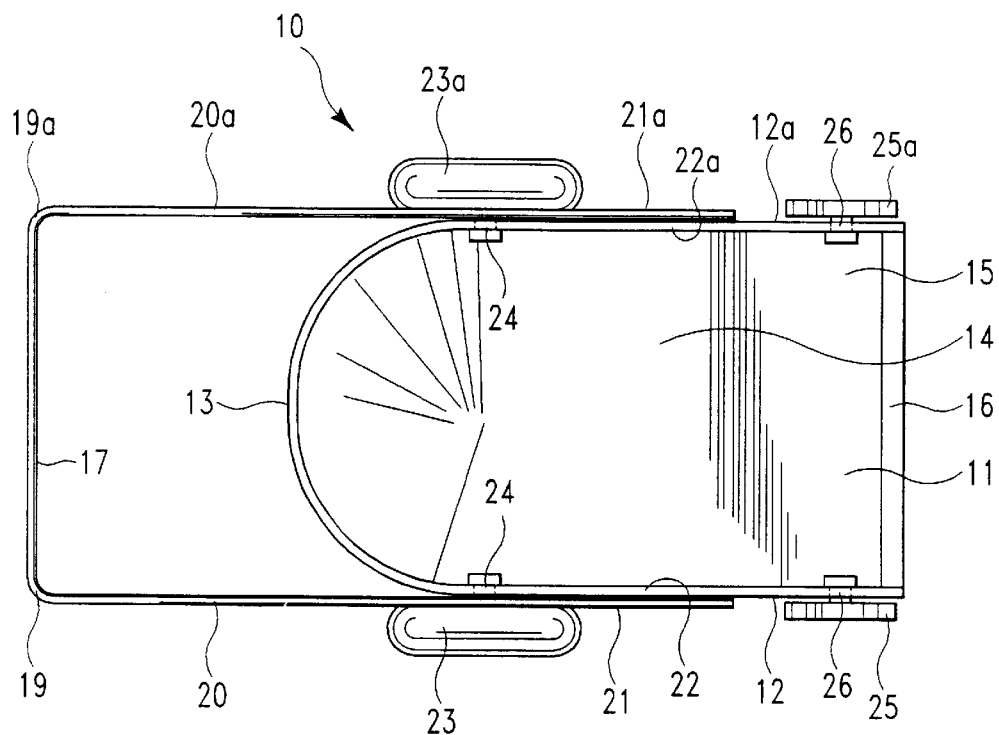
FIG. 1 is a top plan view of the novel shoveling hand cart apparatus.
Figure 2:
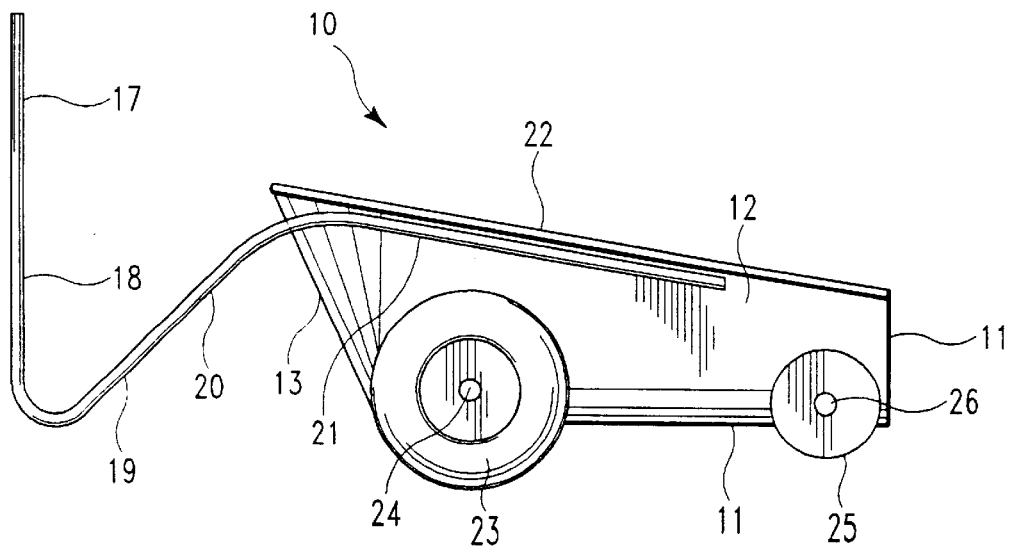
FIG. 2 is a side elevation view thereof.
Figure 3:
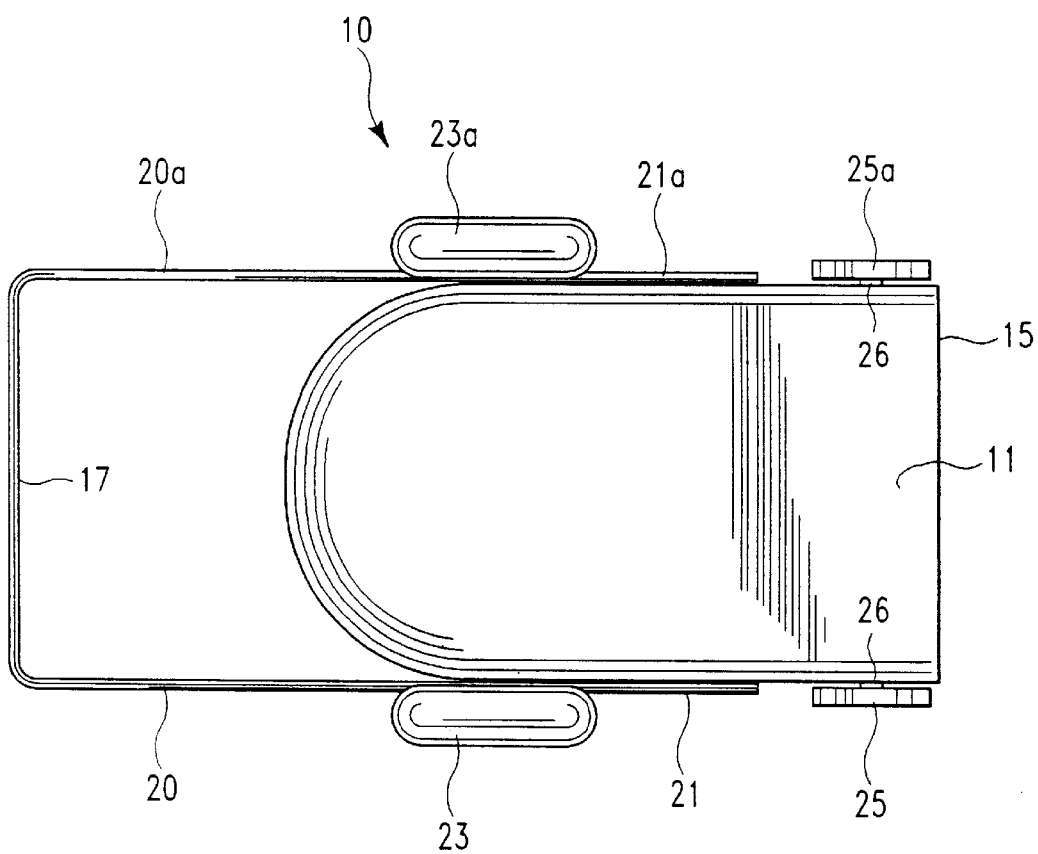
FIG. 3 is a bottom plan view thereof.
Figure 4:
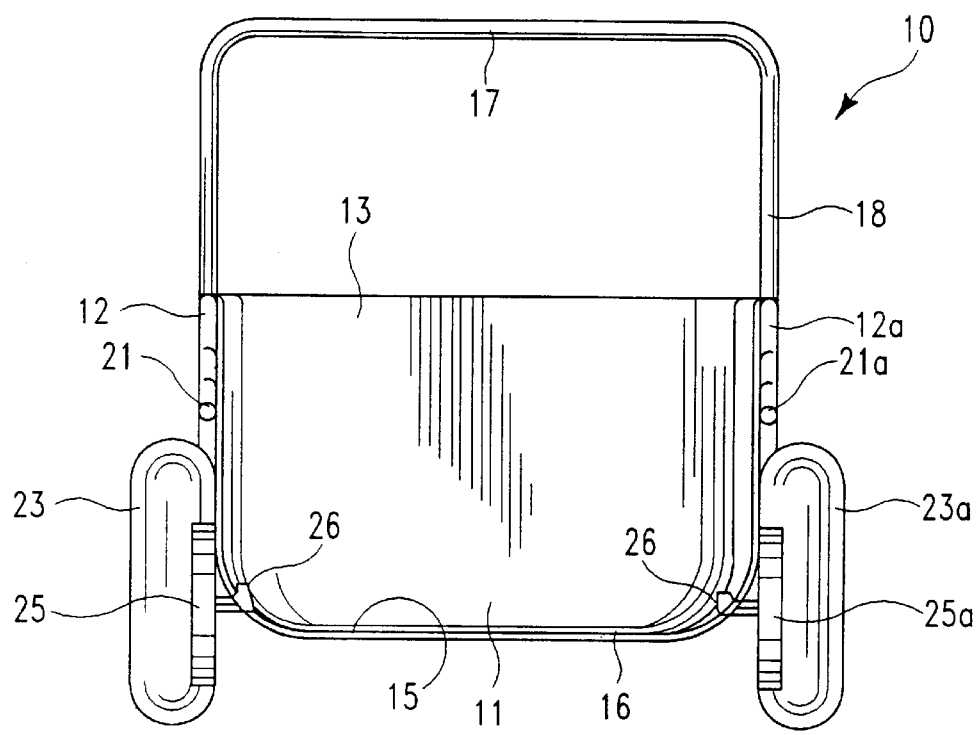
FIG. 4 is a frontal elevational view thereof.
Figure 5:
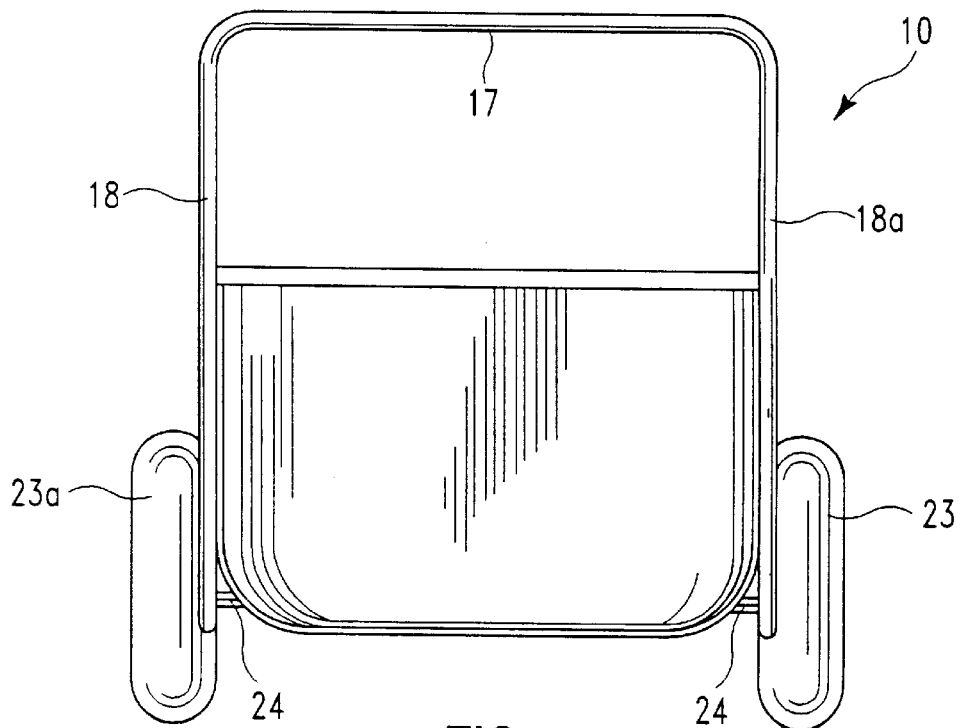
FIG. 5 is a rear elevational view thereof.

As shown in the figures, the novel shoveling hand cart apparatus 10 comprises a device having a base 11 with a pair of sidewalls 12 and 12a with a curved rear wall 13 forming a unibody bin 14 constructed of stamped metal, molded wood fiber, plastic or fiberglass. The combination of the base 11, sidewalls 12 and 12a and the curved rear wall 13 form the unibody holding bin 14 that has an open front side to facilitate loading and unloading. The edge 15 of the base 11 at the open side is reinforced 16 to ensure the durability of the shoveling hand cart apparatus. The curved rear wall 13 has a greater vertical elevation than the sidewalls 12 and 12a. The vertical elevation of the sidewalls 12 and 12a is also angled downward as the sidewall 12 and 12a extends toward the front open portion of the shoveling hand cart apparatus 10.

The handle 17 of the shoveling hand cart apparatus is uniquely designed to provide the maximum leverage for the individual using the cart. It has an extended descending vertical section 18 which extends downwardly almost to the level even with the base 11 of the apparatus. The handle 17 then curves 19 and 19a inward toward the apparatus and then extends 20 and 20a to the elevated area where the sidewalls 12 and 12a meet with the curved rear wall 13 and then is attached 21 and 21a to the sidewalls 12 and 12a along the top edge 22 and 22a of the sidewalls 12 and 12a. The unique design of the handle allows the user to push and gently lift the apparatus to move it and vary the angle of attack of the front portion of the unibody bin to scoop and shovel loads at various heights and speeds.

The other feature which provides a great leverage and support are the two sets of wheels on the apparatus. The large rear wheel 23 and 23a are located just forward of the point at which the rear wall 13 meets the sidewalls 12 and 12a. An axle 24 is attached on the side or to the bottom side of the base 11 and connects the two rear wheels 23 and 23a to the apparatus 10. The two smaller front wheels 25 and 25a are located just in back of the forward edge 15 of the shoveling hand cart apparatus 10 and are attached by means of an axle 26 attached on the side of the bin or the bottom of the base 11. This positioning provides a great deal of stability for the apparatus. It also acts as a load bearing structure as are the rear wheels. The front glide wheels serve to keep the front edge from tripping on the surface and they aid in keeping the bin from diving too deeply into a load.

In operation, the user would move the shoveling hand cart apparatus the load to be moved. The cart can then be levered under a load similar to a hand cart, shoveled into a pile of material or the material can be loaded into the holding bin area of the shoveling hand cart apparatus. When the load is in position, the cart can then be wheeled to whatever location the individual desires and then unloaded by shoveling out the holding bin area or by simply dumping the load by lifting the handle which tilts the bin.

Figure 6:
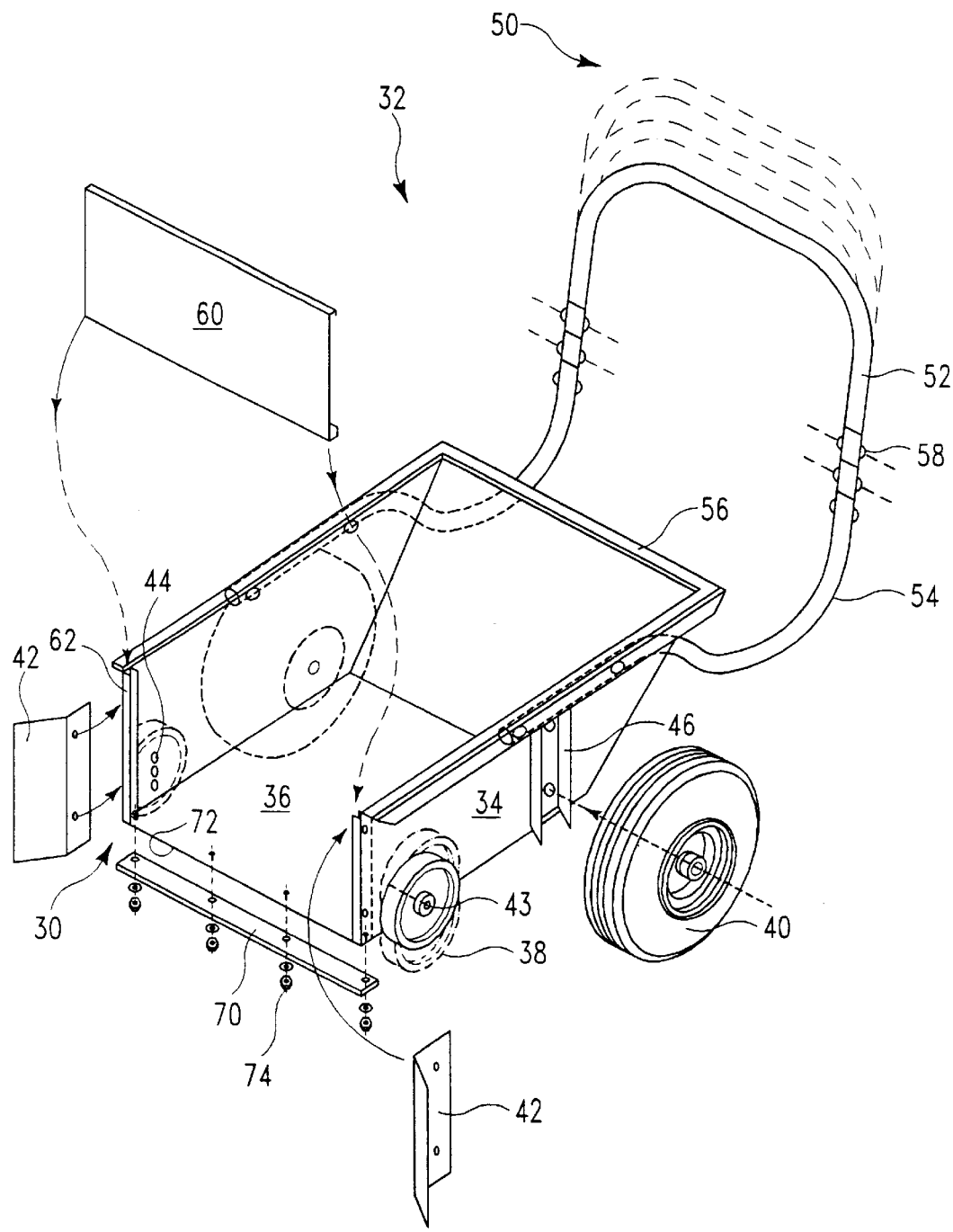
FIG. 6 is a perspective view of the cart of the present invention having a sidewall meeting a bottom at approximately a right angle, and showing a replaceable front edge, removable front gate, height adjustable handle, height adjustable front wheels, wings, and reinforcing brace.

Front 30 of cart 32 has sidewalls 34 that meet base 36 at approximately right angles, as shown in FIG. 6, reducing the amount of material being scooped that can lodge in front wheels 38 and rear wheels 40. Wings 42 can be provided to further deflect material being scooped away from front wheels 38. Front wheels 38 have axles 43 that are mounted through holes 44 in side walls 34. Multiple holes 44 can be included in each sidewall 34 to allow for adjusting the height of front wheels 38. Side wall 34 can also include reinforcing brace 46 for additional sidewall strength.

Similarly, handle 50 includes adjustable upper handle portion 52 that connects to handle base 54 with screws or bolts, as also shown in FIG. 6. Handle base 54 connects to cart 32 along sidewalls 34 under rim 56. Tubing for upper handle portion 52 has an inside diameter slightly larger than the outside diameter of tubing for handle base 54 so upper handle portion 52 fits over handle base 54. Multiple holes 56 are included in handle portion 52 or handle base 54 to allow moving bolt 58 on each side for adjusting height of handle 50 for different height users of cart 32.

Removable front gate 60 can slide in brackets 62 along inner sides of sidewalls 34 of cart 32. Thus, gate 60 can be inserted once cart 32 is loaded and ready for transport. It can also be inserted before cart 32 is loaded. Gate 60 can be removed for dumping or reloading.

Removable bar 70 is connected to reinforce the bottom surface of front edge 72 with removable fasteners 74. Removable bar 70 is about ¼ inch thick and is formed of a metal such as cold rolled steel, high carbon steel or a plastic, such as ultra high molecular weight polyethylene, teflon, glass reinforced nylon, acrylic, or Delrin. Removable bar 70 can have threaded holes to receive removable fasteners 74, which can be round headed screws. Self tapping screws, bolts, rivets, or other fasteners can also be used.

Figure 7:
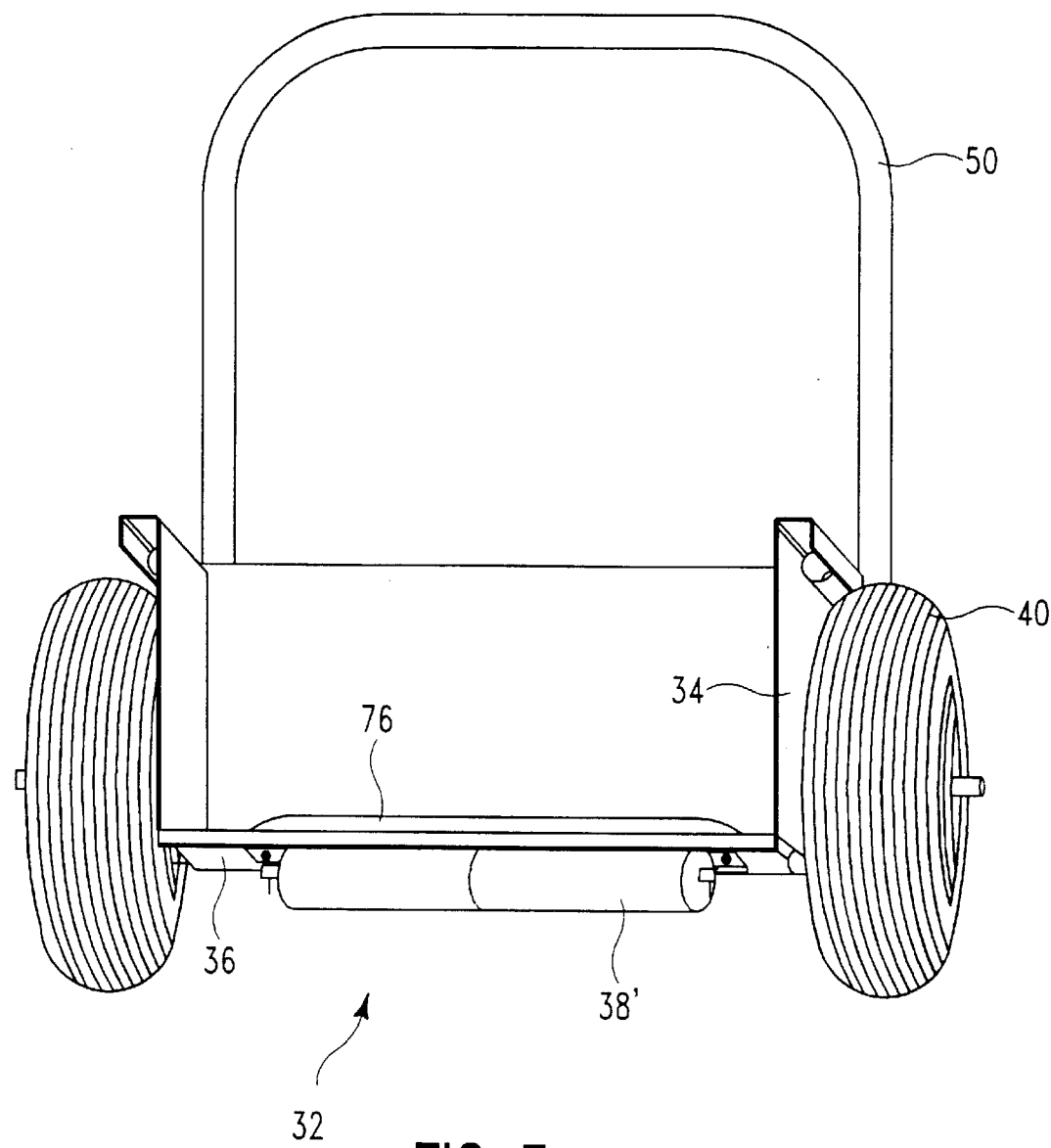
FIG. 7 is a perspective view of the cart of the present invention having a single front wheel
Figure 8A:
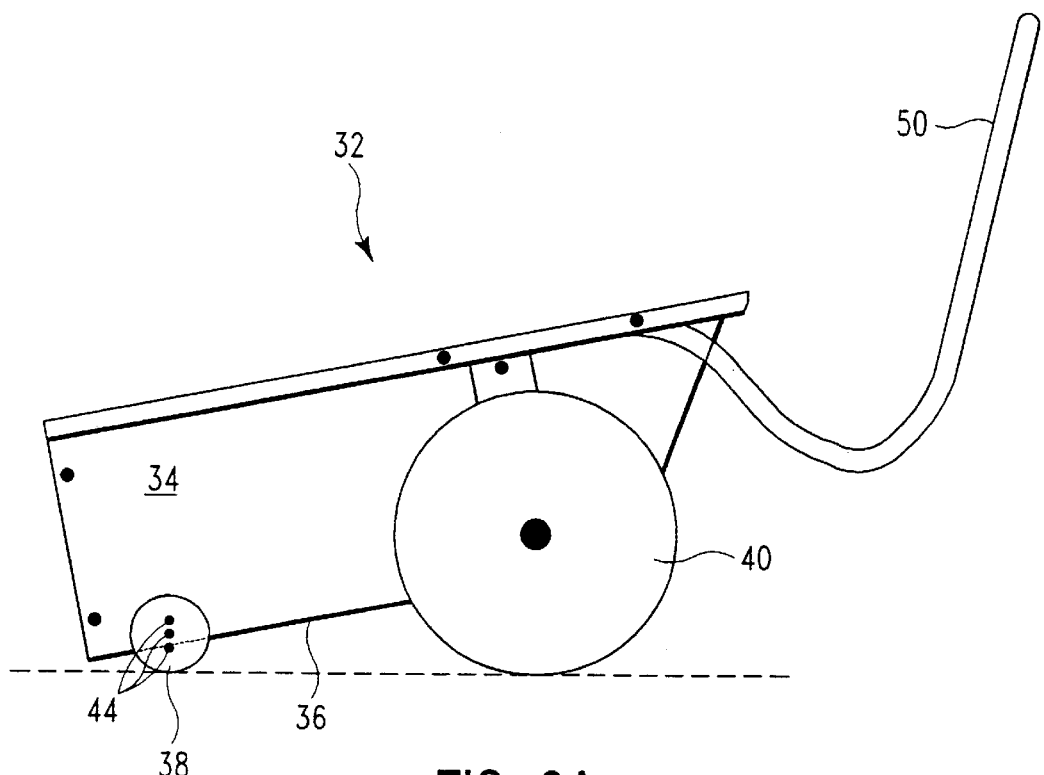
FIG. 8 is a side view of the cart of the present invention showing both a single front wheel under the base as in FIG. 7, and also showing the alternative of front wheels connected through sidewalls, as in FIG. 6.
Figure 8B:
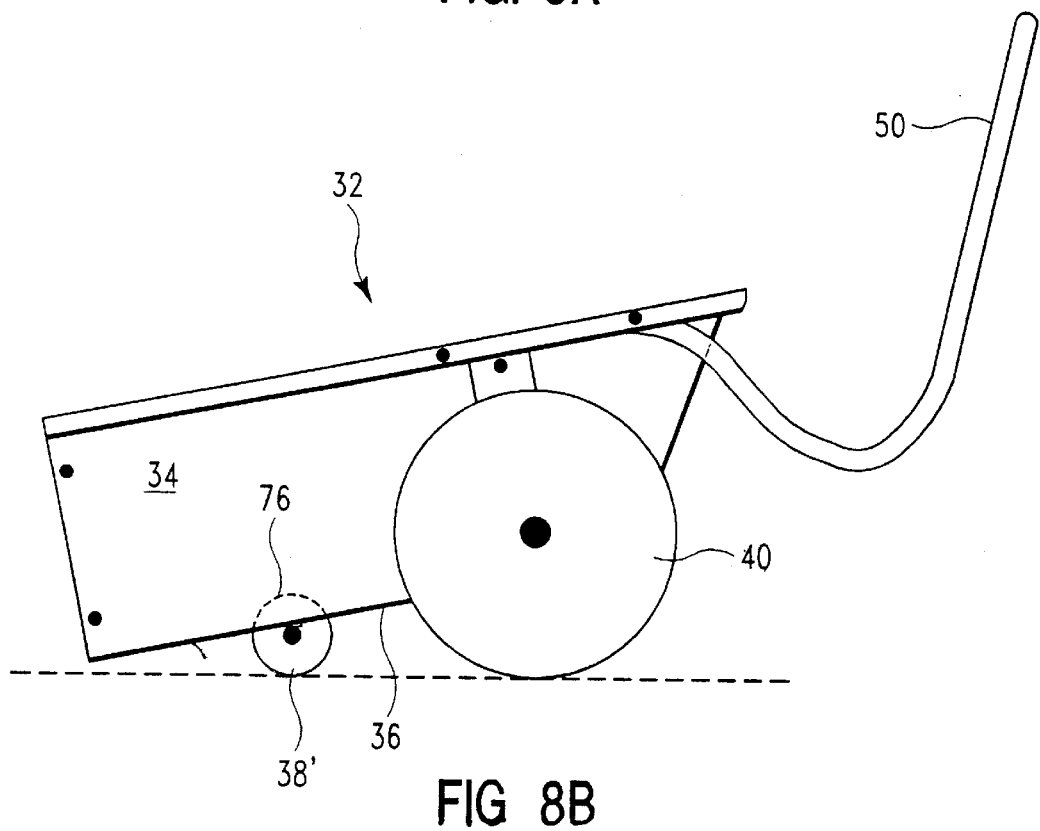

In one alternative, single front wheel 38' located under base 36 of cart 32, can be used, as shown in front view in FIG. 7 and in side view in FIG. 8. Recess 76 is provided in base 36 for single front wheel 38'. Also shown in FIG. 8 is the alternative of adjustable front wheel 38 mounted to side wall 34 as shown in perspective view in FIG. 6. With either front wheels 38 or front wheel 38', front edge 30 of cart 32 scrapes along the plane defined by the bottoms of front wheels 38, 38' and back wheels 40-typically the ground—to scoop material on that plane. While I have described my invention in connection with specific embodiments thereof, it is clearly to be understood that this is done only by way of example and not as a limitation to the scope of my invention as set forth in the objects thereof and in the appended claims.

I claim:

1. A wheeled cart for scooping or shoveling a material, the cart comprising a scooping bin, a front wheel assembly, a back wheel assembly, and a handle, said scooping bin comprising an open front section having a front edge, wherein said back wheel assembly is not directly attached to said handle, wherein said front wheel assembly comprises a front wheel having a front wheel axle, wherein said front edge is supported by said front wheel to provide said front edge at a level below said front wheel axle to permit pushing the cart to scoop or shovel the material into the cart.

2. A wheeled cart as recited in claim 1, wherein said handle is connected to said bin at a location to permit scooping with said bin and lifting said bin without changing handle position with respect to said bin and wherein said handle provides leverage for lifting said bin and wherein said handle connection point facilitates pushing the cart.

3. A wheeled cart as recited in claim 1, wherein said handle comprises a horizontal piece.

4. A wheeled cart as recited in claim 1, wherein said handle comprises a vertical section.

5. A wheeled cart as recited in claim 4, wherein said handle comprises a curved section attached to said vertical section.

6. A wheeled cart as recited in claim 1, wherein said front wheel assembly is for keeping the bin from diving too deeply into a load.

7. A wheeled cart as recited in claim 1, wherein said back wheel assembly comprises a backwheel axle, said bin comprises a wall, and said axle extends through said wall.

8. A wheeled cart as recited in claim 7, wherein said scooping bin has space behind said back wheel axle.

9. A wheeled cart as recited in claim 1, wherein said front wheel axle is connected to said bin.

10. A wheeled cart as recited in claim 9, wherein said front wheel axle extends through a wall of said bin.

11. A wheeled cart as recited in claim 1, wherein said front edge has reinforcement.

12. A wheeled cart as recited in claim 1, wherein said back wheel assembly comprises a pair of back wheels, wherein said back wheels define an axis and said handle is connected to said bin at a connection point spaced above said axis.

13. A wheeled cart as recited in claim 12, wherein said handle is connected to said bin at said connection point to permit providing a force on said bin for pushing said bin or a force on said bin for lifting said bin without changing said handle position with respect to said bin.

14. A wheeled cart as recited in claim 1, wherein said front wheel assembly further comprises a pair of front wheels and-wherein said back wheel assembly comprises a pair of back wheels.

15. A wheeled cart as recited in claim 14, wherein said back wheels are larger than said front wheels.

16. A wheeled cart as recited in claim 14, wherein said front wheels are for preventing said front edge from penetrating below a plane defined by said front wheels and said back wheels when said cart is pushed.

17. A wheeled cart as recited in claim 1, wherein said front wheel is height adjustable.

18. A wheeled cart as recited in claim 11, wherein said front wheel comprises a single front wheel.

19. A wheeled cart as recited in claim 1, further comprising a replaceable reinforcing front edge.

20. A wheeled cart as recited in claim 1, further comprising a removable front gate.

21. A wheeled cart as recited in claim 1, further comprising a height adjustable handle.

22. A wheeled cart as recited in claim 11, wherein said bin comprises a side wall and a bottom surface, wherein said side wall and bottom surface meet at approximately a right angle.

23. A wheeled cart as recited in claim 1, wherein said bin comprises a side wall, wherein said side wall includes a deflecting wing.

24. A wheeled cart as recited in claim 1, wherein said bin comprises a side wall, wherein said side wall includes a reinforcing brace.

25. A wheeled cart as recited in claim 1, wherein said bin has side walls and wherein said handle is attached to said side walls.

26. A wheeled cart as recited in claim 25, wherein said bin has side walls and wherein said handle is attached to top edges of said side walls.

27. A wheeled cart, comprising a bin having a handle, said bin including a base and an open front section, said base having a front edge along said open front section wherein said front edge is at a level to permit scooping, shoveling, or loading without lifting over an elevated side, said bin supported by a front wheel assembly and a pair of back wheels, said back wheels defining an axis, said bin having space behind said axis while said bin is in scooping, shoveling, or loading position.

28. A wheeled cart as recited in claim 27, wherein said bin also has space below said axis.

29. A wheeled cart as recited in claim 27, wherein bottoms of said front wheel assembly and said pair of back wheels define a plane, wherein said base is not parallel to said plane.

30. A wheeled cart for scooping or shoveling a material, the cart comprising a scooping bin, a front wheel assembly, and a back wheel assembly, said scooping bin having an open front section having a front edge shaped for scooping or shoveling, wherein said front wheel assembly comprises a front wheel having a front wheel axle, wherein said front edge is supported by said front wheel to provide said front edge at a level below said front wheel axle to permit pushing the cart to scoop or shovel the material into the cart.

31. A wheeled cart as recited in claim 30, wherein said back wheel assembly comprises back wheels and said front wheel assembly comprises at least one front wheel, wherein said back wheels are larger than said front wheel.

32. A wheeled cart as recited in claim 30, wherein said front wheel assembly comprises at least one front wheel, wherein said at least one front wheel is for keeping said bin from diving too deeply into a load.

33. A wheeled cart as recited in claim 30, wherein said front wheel assembly comprises front wheel axles, wherein said front wheel axles are connected to said bin.

34. A wheeled cart as recited in claim 33, wherein each said front wheel axle extends through a wall of said bin.

35. A wheeled cart as recited in claim 30, wherein said back wheel assembly comprises a pair of back wheel axles, wherein each said axle extends through said closed wall, wherein said back wheel axles define an axis, said bin having space behind said axis.

36. A wheeled cart as recited in claim 30, wherein said front edge has reinforcement.

37. A wheeled cart as recited in claim 30, further comprising a handle, said handle comprising a grasping element comprising a horizontal piece.

38. A wheeled cart as recited in claim 37, wherein said handle further comprises a vertical section.

39. A wheeled cart as recited in claim 38, wherein said handle comprises a curved section attached to said vertical section.

40. A wheeled cart as recited in claim 37, wherein said handle is attached to top edges of said side walls.

41. A wheeled cart as recited in claim 30, wherein said back wheel assembly comprises a back wheel and a back axle, wherein said back axle extends through said back wheel and through said closed side wall.

42. A wheeled cart for scooping or shoveling a material, the cart comprising a scooping bin having a plurality of closed walls, said scooping bin further comprising a base and an open front section, said base having a front edge along said open front section shaped for scooping or shoveling, said scooping bin supporting a pair of front wheels and a pair of back wheels, wherein said front wheels are for preventing said front edge from penetrating below a plane defined by said front wheels and said back wheels when said cart is pushed and wherein said front and back wheels connect to said bin at positions to provide said base tilted with respect to a plane defined by bottoms of said front and back wheels to facilitate scooping or shoveling.

43. A wheeled cart as recited in claim 42, wherein said back wheels are larger than said front wheels.

44. A wheel cart as recited in claim 42, wherein said front wheels are for keeping the bin from diving too deeply into the material.

45. A wheeled cart as recited in claim 42, wherein said front wheels are for preventing said front edge from penetrating below a plane defined by said front wheels and said back wheels when said cart is pushed.

46. A wheeled cart as recited in claim 42, wherein said back wheels comprise back wheel axles and each said back wheel axle extends through a wall of said bin.

47. A wheeled as recited in claim 42, wherein said front wheels comprise front wheel axles and said front wheel axles are connected to said bin.

48. A wheeled cart as recited in claim 47, wherein each said front wheel axle extends through a wall of said bin.

49. A wheeled cart as recited in claim 42, wherein said back wheel axles define an axis, said bin having space behind said axis.

50. A wheeled cart as recited in claim 42, wherein said front edge has reinforcement.

51. A wheeled cart as recited in claim 42, further comprising a handle, said handle comprising a grasping element comprising a horizontal piece.

52. A wheeled cart as recited in claim 51, wherein said handle further comprises a vertical section.

53. A wheeled cart as recited in claim 52, wherein said handle further comprises a curved section attached to said vertical section.

54. A wheeled cart as recited in claim 51, wherein said closed walls include side walls and wherein said handle is attached to top edges of said side walls.

55. A wheeled cart, comprising a scooping bin, a handle, a front wheel assembly, and a back wheel assembly, said scooping bin comprising an open front section having a front edge for scooping or shoveling material wherein said bin supports said front wheel assembly, said back wheel assembly, and said handle, wherein said front wheel assembly comprises a front wheel axle and said front wheel assembly supports said front edge at a level below said front wheel axle and at a level equal or above a plane defined by bottoms of said front wheel assembly and said back wheel assembly.

56. A wheeled cart as recited in claim 55, wherein said handle is connected to said bin at a location to permit scooping with said bin and lifting said bin without changing handle position with respect to said bin.

* * * * *